(12) United States Patent
Milacic et al.

(10) Patent No.: US 9,437,890 B2
(45) Date of Patent: Sep. 6, 2016

(54) PURGE ASSEMBLY FOR A FUEL CELL SYSTEM

(71) Applicant: Ford Global Technologies, LLC, Dearborn, MI (US)

(72) Inventors: Milos Milacic, New Boston, MI (US); Kurt David Osborne, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 609 days.

(21) Appl. No.: 13/925,990

(22) Filed: Jun. 25, 2013

(65) Prior Publication Data

US 2014/0377671 A1     Dec. 25, 2014

(51) Int. Cl.
*H01M 8/04* (2016.01)
*H01M 8/06* (2016.01)
*H01M 8/10* (2016.01)

(52) U.S. Cl.
CPC ....... *H01M 8/0662* (2013.01); *H01M 8/04097* (2013.01); *H01M 8/04164* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 2003/0138688 A1* | 7/2003 | Hattori | H01M 8/04029 429/425 |
| 2004/0229098 A1* | 11/2004 | Fujita | H01M 8/04089 429/414 |
| 2009/0162730 A1 | 6/2009 | Ohira et al. | |
| 2011/0097637 A1 | 4/2011 | Ko et al. | |

\* cited by examiner

*Primary Examiner* — Ula C Ruddock
*Assistant Examiner* — Tony Chuo
(74) *Attorney, Agent, or Firm* — Brooks Kushman P.C.; Damian Porcari

(57) ABSTRACT

A fuel cell purge apparatus for a fuel cell system has a separator defining a chamber for receiving a recirculated fuel stream including a fluid and impurities. The apparatus has a drain conduit with an outer passage connected to the chamber. The outer passage forms a fluid trap to collect the fluid. The drain conduit also has an inner passage nested within the outer passage through the fluid trap for delivering the impurities to a purge valve. The inner passage has a free end extending into the chamber of the separator.

20 Claims, 2 Drawing Sheets

PURGE ASSEMBLY FOR A FUEL CELL SYSTEM

TECHNICAL FIELD

Various embodiments relate to a system for purging impurities or draining water from a fuel cell.

BACKGROUND

It is known that a number of fuel cells are joined together to form a fuel cell stack. Such a stack generally provides electrical current in response to electrochemically converting hydrogen and oxygen into water. The electrical current generated in such a process is used to drive various devices in a vehicle or other such apparatus. A supply generally provides hydrogen to the fuel cell stack. The fuel cell stack may use less hydrogen than provided by the supply to generate electrical power. An ejector receives unused hydrogen discharged from the fuel cell stack and combines the unused hydrogen with the hydrogen generated from the supply to sustain a flow of hydrogen to the fuel cell stack.

During fuel cell operation, byproducts such as product water and nitrogen, and unconsumed hydrogen may form at the anode side of a fuel cell stack. In certain known systems, accumulation of product water and/or nitrogen is controlled, for example, in an attempt to avoid a reduction in fuel cell performance. One known approach is to release the water and/or nitrogen via a passageway downstream of the fuel cell stack. The byproducts may be recirculated such that the unused or unconsumed hydrogen is returned to the anode side of the fuel cell stack, thereby improving fuel economy. Recirculation may be used to humidify the anode side to promote efficient chemical conversion and extend cell membrane life. However, liquid water in the recirculation stream, such as droplets, may need to be removed to prevent water blockages within fuel cell stack flow field channels or an ejector.

For a fuel cell application in a vehicle, the fuel cell may be required to operate in freezing ambient temperatures. The vehicle and fuel cell may be exposed to temperatures of −25 Celsius or even lower, well below the freezing point for water. Cold weather operating issues need to be addressed for a fuel cell vehicle to operate in climates with extreme ambient temperatures, and to meet user expectations for the vehicle. When exposed to freezing conditions, hydrogen fuel cell components, such as a drain or purge assembly, containing reactant fluids and water may experience operating issues due to ice formation.

For prior art systems with a combined anode purge/drain assembly, costs are reduced; however, the assembly may be sensitive to product water freezing during the freeze start. Ice buildup within the combined anode purge/drain assembly may affect the anode purge function, leading to nitrogen accumulation in the anode stack and reduced fuel cell performance. Prior art fuel cell systems have used heater assemblies to actively heat the drain or purge assembly in order to prevent or remove ice formation. The heaters lower overall efficiency for the fuel cell, as they use power from the battery. Other prior art systems require additional plumbing in order to prevent ice blockages within the purge system, such as an auxiliary pipe and additional purge valves.

SUMMARY

In an embodiment, a fuel cell system is provided with a fuel cell stack and a purge assembly in fluid communication with the fuel cell stack. The purge assembly has a separator defining a chamber for receiving a recirculated fuel stream including a fluid portion and an impurities portion. A purge valve is positioned downstream of the separator for purging the impurities portion from the fuel cell system. A drain conduit connects the separator and the purge valve. The drain conduit has an outer passage connected to a lower end of the chamber that forms a fluid trap to collect the fluid portion. The drain conduit also has an inner passage nested within the outer passage and extending through the fluid trap for delivering the impurities portion to the purge valve. The inner passage has a free end extending into the chamber.

In another embodiment, a fuel cell purge apparatus is provided with a separator defining a chamber for receiving a recirculated fuel stream including a fluid and impurities. A drain conduit has an outer passage connected to the chamber that forms a fluid trap to collect the fluid. The drain conduit also has an inner passage embedded within the outer passage through the fluid trap for delivering the impurities to a purge valve. The inner passage has a free end extending into the chamber.

In yet another embodiment, a fuel cell purge assembly is provided with a separator defining a chamber for receiving a recirculated fuel stream including a fluid portion and an impurities portion through an inlet conduit. A purge valve is positioned downstream of the separator for purging the impurities portion from a fuel cell system. A drain conduit connects the separator and the purge valve. The drain conduit has an outer passage connected to a lower end of the chamber that forms a fluid trap to collect the fluid portion. The drain conduit also has an inner passage nested within the outer passage and extending through the fluid trap for delivering the impurities portion to the purge valve. The inner passage has a free end extending into the chamber.

Various embodiments of the present invention have associated non-limiting advantages. For example, a nested drain line from a separator allows for uninterrupted fluid flow from the separator during freezing conditions. The drain line is bent such that the outer conduit forms a trap for liquid water. Any water within the outer conduit is permitted to freeze. Fluids, including byproduct water vapor and nitrogen, continue to flow through the inner conduit when the outer conduit has an ice blockage. This results in purge or drain process being available even during freezing conditions. Any ice formation in the trap is allowed to possibly melt with operation, and therefore the overall fuel cell efficiency is unaffected as there is no heating element. Since the purge or drain process may occur as needed, the fuel cell performance is also unaffected.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Description of constituents in chemical terms refers to the constituents at the time of addition to any combination specified in the description, and does not necessarily preclude chemical interactions among constituents of the mixture once mixed.

Figure 1:
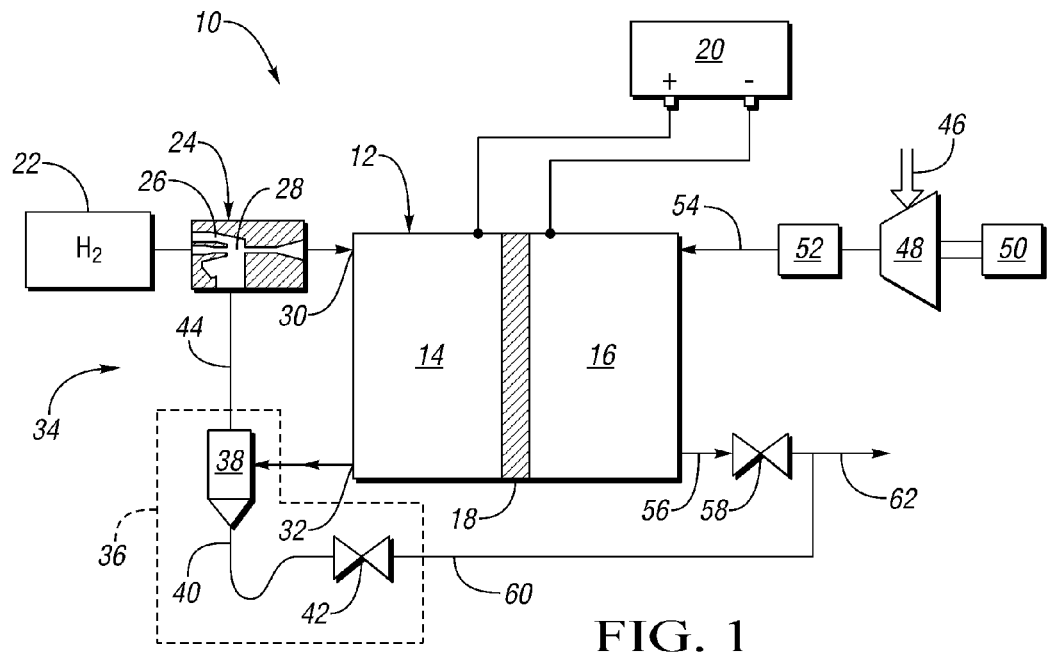
FIG. 1 is a schematic of an embodiment of a fuel cell system according to an embodiment.

FIG. 1 schematically illustrates a fuel cell system 10 as a process flow diagram according to at least one embodiment. For example, fuel cell system 10 may be used in a vehicle to provide electrical power to operate an electric motor to propel the vehicle or perform other vehicle functions. The fuel cell system 10 may be a proton exchange membrane fuel cell (PEMFC) as is known in the art. The system 10 may be implemented in a fuel cell based electric vehicle or a fuel cell based hybrid vehicle or any other such apparatus that uses electrical current to drive various devices.

The fuel cell 10 has a fuel cell stack 12. The stack 12 contains multiple cells, with each cell having an anode side 14, a cathode side 16, and a membrane 18 therebetween. Only one fuel cell of the fuel cell stack is illustrated in FIG. 1, although the stack 12 contains any number of cells. The fuel cell 10 electrically communicates with and provides energy, for example, to a high voltage bus 20 or a traction battery. The fuel cell stack 12 generates stack current in response to electrochemically converting hydrogen and oxygen. The fuel cell stack 12 may also have a cooling loop (not shown).

Various electrical devices may be coupled to the high voltage bus or battery 20 to consume such power in order to operate. If the system 10 is used in connection with a vehicle, the devices may include a motor or a plurality of vehicle electrical components that each consume power to function for a particular purpose. For example, such devices may be associated with and not limited to a vehicle powertrain, cabin heating and cooling, interior/exterior lighting, entertainment devices, and power locking windows. The particular types of devices implemented in the vehicle may vary based on vehicle content, the type of motor used, and the particular type of fuel cell stack implemented.

During operation of the fuel cell 10, product water, residual fuel such as hydrogen, and byproducts such as nitrogen, may accumulate at the anode side 14 of the fuel cell stack 12. Attempts have been made to remove the liquid product water and byproducts and to reuse the residual hydrogen and at least a portion of the water vapor. One approach is to collect those constituents in a purge assembly 36 downstream of the fuel cell stack 12, separate at least a portion of the liquid water and/or nitrogen, and return the remaining constituents to the fuel cell stack 12 via a return passageway in a recirculation loop. Various embodiments of the purge assembly 36 include a secondary drain passage positioned inside a primary drain passage to separate the liquid water stream from the remaining constituents prior to the purge valve thus enabling nitrogen to be purged even in the presence of ice formation within the purge assembly 36 due to freezing conditions, such as at fuel cell start up.

A primary fuel source 22 is connected to the anode side 14 of the fuel cell stack 12, such as a primary hydrogen source, to provide a supply fuel stream (or an anode stream). Non-limiting examples of the primary hydrogen source 22 are a high-pressure hydrogen storage tank or a hydride storage device. For example, liquid hydrogen, hydrogen stored in various chemicals such as sodium borohydride or alanates, or hydrogen stored in metal hydrides may be used instead of compressed gas. A tank valve (not shown) controls the flow of the supply hydrogen. A pressure regulator (not shown) regulates the flow of the supply hydrogen.

The hydrogen source 22 is connected to one or more ejectors 24. The ejector may be a variable or multistage ejector or other suitable ejector. The ejector 24 is configured to combine the supply hydrogen (e.g., hydrogen received from the source 22) with unused hydrogen (e.g., recirculated from the fuel cell stack 12) to generate an input fuel stream. The ejector 24 controls the flow of the input fuel stream to the fuel cell stack 12. The ejector 24 has a nozzle 26 supplying hydrogen into the converging section of a converging-diverging nozzle 28. The diverging section of the nozzle 28 is connected to the input 30 of the anode side 14.

The output 32 of the anode side 14 is connected to a recirculation loop 34. The recirculation loop 34 may be a passive recirculation loop, as shown, or may be an active recirculation loop according to another embodiment. Typically, an excess of hydrogen gas is provided to the anode side 14 to ensure that there is sufficient hydrogen available to all of the cells in the stack 12. In other words, hydrogen is provided to the fuel cell stack 12 above a stoichiometric ratio of one, i.e. at a fuel rich ratio relative to exact electrochemical needs. The unused fuel stream, or recirculated fuel stream, at the anode output 32 may include various impurities such as nitrogen and water both in liquid and vapor form in addition to hydrogen. The recirculation loop 34 is provided such that excess hydrogen unused by the anode side 14 is returned to the input 30 so it may be used and not wasted.

Accumulated liquid and vapor phase water is an output of the anode side 14. The anode side 14 requires humidification for efficient chemical conversion and to extend membrane life. The recirculation loop 34 may be used to provide water to humidify the supply hydrogen gas before the input 30 of the anode side 14. Alternatively, a humidifier may be provided to add water vapor to the input fuel stream.

The recirculation loop 34 contains a purging assembly 36 to remove impurities or byproducts such as excess nitrogen, liquid water, and/or water vapor from the recirculation stream. The purging assembly 36 includes a water separator or knock-out device 38, a drain line 40 and a control valve 42, such as a purge valve. The separator 38 receives a stream or fluid mixture of hydrogen gas, nitrogen gas, and water from the output 32 of the anode side 14. The water may be mixed phase and contain both liquid and vapor phase water. The separator 38 removes at least a portion of the liquid phase water, which exits the separator through drain line 40. At least a portion of the nitrogen gas, hydrogen gas, and vapor phase water may also exit the drain line 40, and pass through a control valve 42, for example, during a purge process of the fuel cell stack 12. The control valve 42 may be a solenoid valve or other suitable valve. The remainder of the fluid in the separator 38 exits through passageway 44 in the recirculation loop 34, which is connected to the ejector 24. The stream in passageway 44 may contain a substantial amount of hydrogen compared to the output (i.e. outlet) 32. The fluid in passageway 44 is fed into the converging section of the converging-diverging nozzle 28 where it mixes with incoming hydrogen from the nozzle 26 and hydrogen source 22.

The purging assembly 36 may also include a hydrogen concentration sensor that measures the amount of hydrogen in the unused fuel steam, for example, at the anode output 32. When the sensor detects an amount of hydrogen that is less than a predetermined hydrogen set point, there may be excess nitrogen in the fuel cell system 10, and the valve 42 may be opened to discharge the nitrogen from the unused fuel stream. In response to the purge valve 42 opening to discharge nitrogen, the flow of supply hydrogen may be increased. The valve 42 may be commanded to close in response to the sensor detecting that the hydrogen in the unused fuel stream is above the predetermined hydrogen set point.

Liquid water may be removed from the anode side 14 by the purge assembly 36 to prevent water blockages within the channels and cells of the anode side 14. Water blockages within the fuel cell stack 12 may lead to decreases in cell voltage and/or voltage instabilities within the fuel cell stack 12. Liquid water may also be removed by the separator 38 to prevent a blockage or partial blockage within the ejector 24. A liquid water droplet in the diverging section of the converging-diverging nozzle 28 effectively creates a second venturi section within the nozzle 28 and lead to pumping instabilities for the ejector 24. The drain line 40 of the purge assembly 36 is configured to prevent a blockage of the drain line 40 during ice formation caused by freezing conditions. By preventing ice blockages within the drain line 40, the fuel cell stack 12 may be purged of excess water and/or nitrogen even in freezing conditions, thereby improving fuel cell 10 performance and operating efficiencies.

The cathode side 16 of the stack 12 receives oxygen in a cathode stream, for example, as a constituent in an air source 46 such as atmospheric air. In one embodiment, a compressor 48 is driven by a motor 50 to pressurize the incoming air. The pressurized air, or cathode stream, may be humidified by a humidifier 52 before entering the cathode side 16 at inlet 54. The water may be needed to ensure that membranes (not shown) in the fuel cell stack 12 remain humidified to provide for optimal operation of the fuel cell stack 12. The output 56 of the cathode side 16 is configured to discharge excess air and is connected to a valve 58. Drain line 60 from the purging assembly 36, may be connected to an outlet 62 downstream of the valve 58. In other embodiments, the drain lines may be plumbed to other locations in the fuel cell system 10.

Additionally, as purging assembly 36 receives fluid flow from the anode side 14, the separator 38, valve 42 and drain lines (i.e. drain conduits) 40, 60 need to be designed for use with hydrogen gas. Generally, hydrogen gas may cause material degradation or embrittlement issues and material used in the purging assembly 36 need to be hydrogen compatible. Examples of materials for use with the purging assembly 36 include stainless steel, polytetrafluoroethylene (PTFE), and the like.

Figure 2:
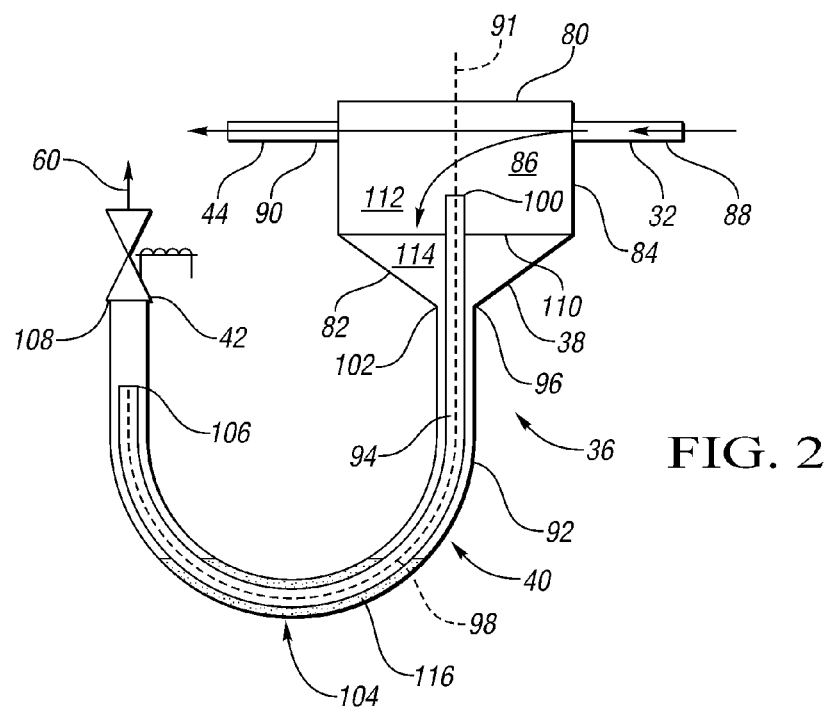
FIG. 2 is a schematic of a purge assembly for a fuel cell according to an embodiment.

FIG. 2 illustrates a purging assembly 36 for use with the fuel cell system 10. The separator 38 has a first upper end wall 80 and a second lower end wall 82. A side wall 84 extends between the ends 80, 82. The first and second ends 80, 82 and the wall 84 define a separation chamber 86. The side wall 84 may be a generally cylindrical wall. In other embodiments, the side wall 84 may be tapered into a frustoconical shape or another suitable shape. The lower end wall 82 may have a conical, frustoconical, or another suitable shape to assist in liquid water drainage from the separator 38. For example, the end wall 82 may be concave, bowl shaped, or planar. The upper wall 80 may be planar, or another suitable shape to guide the rotational flow.

The separator 38 has an inlet conduit 88 and an outlet conduit 90. The inlet conduit 88 is connected to outlet 32 of the anode side 14 of the fuel cell stack 12. The inlet conduit 88 may be tangentially or otherwise connected to the side wall 84 to induce swirl and rotational flow of the fluid in the chamber 86. In another embodiment, the inlet conduit 88 is connected generally perpendicularly to the side wall 84. The outlet conduit 90 may be connected to the side wall 84 or the upper wall 80 of the chamber 86. The outlet conduit 90 may be connected generally perpendicularly to one of the walls 80, 84 of the chamber 86, and the connection angle may vary according to other embodiments. The outlet conduit 90 is connected to passageway 44 of the recirculation loop 34. For a vehicle or fuel cell application, the inlet and outlet conduits 88, 90 may be positioned along a common axis. Alternatively, the inlet and outlet conduits 88, 90 are positioned such that they are not along a common axis, or not in-line with one another, for example, the inlet and outlet conduits 88, 90 may lie along different axes and/or in different planes.

A drain conduit 40 is positioned at or near the lowest point of the end wall 82, and is typically positioned in the center or a central region of the end wall 82, or along the longitudinal axis 91 of the separator 38. In other embodiments, the drain 40 is positioned off-center in the separator 38, or offset from the longitudinal axis 91 of the separator. By positioning the drain 40 at the lowest point of the chamber 86, any liquid within the chamber 86 may be easily removed due to gravity.

The drain conduit 40 has a primary flow passage or conduit 92 and a secondary flow passage or conduit 94. The primary flow passage 92 is connected to the drain opening 96 of the end wall 82 at the low point of the separator 38 and forms an outer passage or conduit. The outer diameter of the secondary flow passage 94 is less than the inner diameter of the primary flow passage 92. The secondary flow passage 94 is nested or embedded within the primary flow passage 92 to form an inner passage or conduit. The secondary flow passage 94 may be concentric with the primary flow passage 92 such that they lie along a common longitudinal axis 98. The flow passages 92, 94 may be manufactured from cylindrical tubing, or a tubing with another cross-sectional shape. Separators or spacers (not shown) may be provided periodically along the outer surface of the secondary passage 94 to maintain spacing between the primary and secondary passages 92, 94.

The secondary flow passage 94 extends into the separation chamber 86 such that it is spaced apart from the end wall 82 and away from the drain opening 96. The entrance region 100 to the secondary flow passage 94 is spaced apart from the entrance region 102 to the primary flow passage 92. In one embodiment, entrance region 100 is spaced apart from entrance region 102 along the longitudinal axis of the separator 38 and/or the longitudinal axis 98 of the passages 92, 94.

The drain conduit 40 bends downstream of the separator 38, and is shown as a 180 degree bend, although other configurations are also envisioned including S-bends, and other suitable geometries. By bending the drain 40, a trap 104 is created within the drain 40.

The purge valve 42 is connected to the drain 40 and is positioned downstream of the trap 104. The valve 42 connects the drain 40 to the drain line 60 of the fuel cell 10. The primary passage 94 is connected to the valve 42. The secondary passage 94 may be spaced apart from the valve 42, such that fluid flows within the primary and secondary passages 92, 94 of the drain 40 recombine before reaching the valve 42. As shown in FIG. 2, the exit region 106 of the secondary passage 94 is spaced apart from the exit region 108 of the primary passage 92 and the drain 40 along the longitudinal axis 98 of the drain 40. In another embodiment, both the primary and secondary passages 92, 94 are connected or are adjacent to the valve 42 such that inner passage 94 extends from the valve 42 to within the separation chamber 86.

The trap 104 provides a localized low spot in the purge assembly 36. The trap 104 is spaced apart from and positioned below the separator drain opening 96 and the purge valve 42.

In one embodiment, the separator 38 has a divider 110 dividing the chamber 86 into an upper vortex chamber 112 and a lower collection chamber 114. The divider 110 may be made from a screen or mesh material that permits liquid to drip down into the collection chamber 114. The divider 110 may create a location for condensation to occur, provide a flow-smoothing effect, and/or prevent fluid motion such as splashing from the collection chamber 114. The entrance region 100 to the secondary passage 94 may be located above the divider 110 (as shown), below the divider 110, or be co-located with the divider. When the entrance region 100 is positioned above and spaced apart from the divider 110, the entrance region 100 is further separated from the liquid collection chamber 114 to prevent liquid from entering the secondary passage 94. In other embodiments, the separator 38 does not contain a divider 110 and only has a single chamber 86 that acts to both separate and collect liquid water.

The fluid stream from the anode 14 enters the separator 38 though the inlet conduit 88, and contains hydrogen gas, nitrogen gas, water vapor, and liquid water. The fluid enters the chamber 86, and the side wall 84 or other flow directors guides the fluid in the chamber 86. The fluid is spun in the chamber 86 to remove liquid entrained in the fluid stream. Centripetal acceleration created by the rotational fluid flow causes the heavier liquid droplets to move to the wall 84. Liquid droplets above a certain size are separated from the fluid flow as they cannot follow the turn due to their momentum. The droplets impact the wall 84 and then gravity causes the liquid to run down the wall 84 and into the collection chamber 114. The remaining fluid, which includes hydrogen gas, nitrogen gas, water vapor, and smaller water droplets continue to spin within the separator 38. The smaller water droplets may continue to spin or rotate with the fluid flow if their mass is insufficient for the forces to cause them to move to and impact the wall 84. The fluid stream then exits the separator 38 through the outlet conduit 90.

The liquid water in the separator 38 flows along the end wall 82 and through the drain opening 96 and into the primary flow passage 92. The liquid water flows through the primary flow passage 92, and may collect in the trap 104. During freezing conditions, any collected water in the trap 104 may freeze into ice 116, as shown in FIG. 2. Ice formation in the primary passage 92 may partially or completely block the primary passage 92.

The secondary passage 94 is positioned such that little or no liquid water enters the passage 94. Liquid water may drip into the passage 94, for example, from the upper end wall 80. Liquid water may also condense from the fluid directly above the entrance to the secondary flow passage 94 and fall into the passage 94. In either case, any water accumulation within the secondary flow passage is insignificant relative to the size of the passage 94. Therefore, when the primary flow passage 92 is blocked due to ice formation in the trap 104, the secondary passage 94 remains open and unlocked for flow between the separator 38 and the valve 42. Therefore, when the valve 42 is opened, for example, during a purge or drain process, a fluid stream may flow through the secondary passage 94 when the primary passage 92 is blocked by ice formation. In a prior art device without the primary and secondary passage 92, 94 configuration, ice formation may block the drain of the separator completely, and prevent a purge or drain process.

For example, during a purge process, excess nitrogen is removed from the anode side 14 of the fuel cell. When the concentration or partial pressure of nitrogen in the anode side 14 of the fuel cell is too high, the performance of the fuel cell 10 decreases as there is an insufficient concentration of hydrogen, or the partial pressure of hydrogen is too low. By purging the anode side 14 of the fuel cell, the excess nitrogen is flushed out of the anode side 14 of the stack 12. The mixture of hydrogen, excess nitrogen, and liquid and vapor phase water enters the separator 38 during the purge process. The valve 42 is opened and causes liquid water, excess nitrogen, and a portion of the hydrogen to exit the drain line 40 of the separator 38. When the primary passage 92 is blocked due to icing, the gas phase portion of the fluid stream flow through just the secondary passage 94 to valve 42, while the liquid water continues to collect in the primary passage 92 or the bottom of the separator 38. When the primary passage 92 is not blocked, the fluid stream may flow through both the primary and secondary passages 92, 94, with all of the constituents flowing through the primary passage 92 and the gas phase constituents flowing through the secondary passage 94. Some hydrogen and other constituents in the flow may be returned through the outlet conduit 90 of the separator to the ejector 24. The ejector 24 also may not perform well in the presence of high concentrations of nitrogen, as the density of nitrogen is higher than that of hydrogen. Therefore, by removing excess nitrogen from the anode side 14 of the fuel cell during a purge process, overall fuel cell performance may be increased.

With time, ice formed within the primary passage 92 melts, either due to passive heating as the fuel cell operates, or due to an increase in ambient temperatures. When liquid water is present in the primary passage 92, it may be blown out of the passage 92 and through the open valve 42 to exit the fuel cell 10, for example, during a purge process. Any liquid water present in the secondary passage 94 may also be blown out of the passage 94 during a purge process.

FIGS. 3-6 illustrate various examples of a separator and secondary passage for use with the purge assembly 36. These are representative of various geometries and configurations, and are intended to be illustrative and non-limiting.

Figure 3:
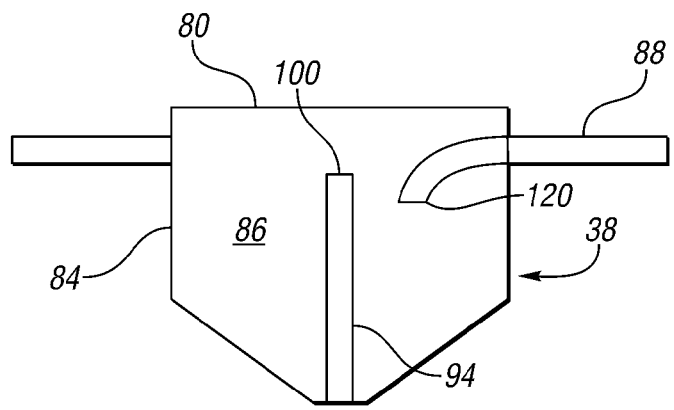
FIG. 3 is a schematic of a separator for a purge system assembly according to an embodiment.

FIG. 3 illustrates a separator 38 having an inlet conduit 88 with an exit region 120 directing the stream in a generally downward direction. The inlet conduit 88 may be connected tangentially, perpendicularly, or at another angle relative to the wall 84. The exit region 120 may extend into the separation chamber 86 and be spaced apart from the wall 84. In some embodiments, the entrance region 100 of the secondary passage 94 is positioned above the exit region 120 of the inlet conduit 88. The entrance region 100 is positioned between the exit region 120 and the upper wall 80 of the separator, with the openings 100, 120 generally facing opposed directions. Therefore, liquid flowing into the separation chamber 86 is unlikely to reach the entrance 100 of the secondary passage 94.

Figure 4:
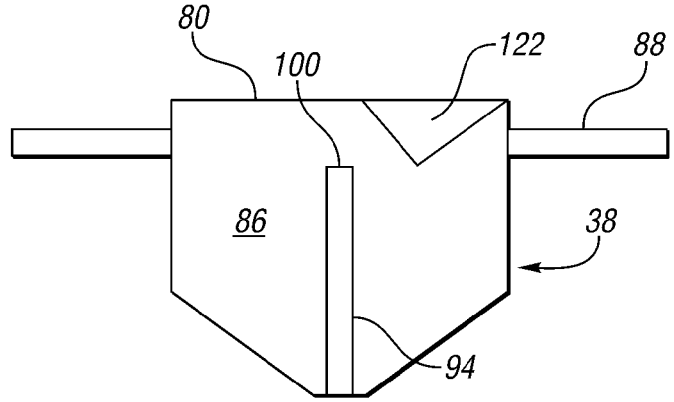
FIG. 4 is a schematic of another separator for a purge assembly according an embodiment.

FIG. 4 illustrates a separator 38 having an inlet conduit 88 with a protrusion 122 directing the stream in a generally downward direction. The protrusion 122 may also act to induce swirl or rotational flow within the chamber 86. The protrusion 122 is connected to or is integrally formed with the upper wall 80, and may include a ramp 124, vane, or other complex surface. In some embodiments, the entrance region 100 of the secondary passage 94 is positioned between the end of the protrusion 122 and the upper wall 80 of the separator. Therefore, liquid flowing into the separation chamber 86 is unlikely to reach the entrance 100 of the secondary passage 94.

Figure 5:
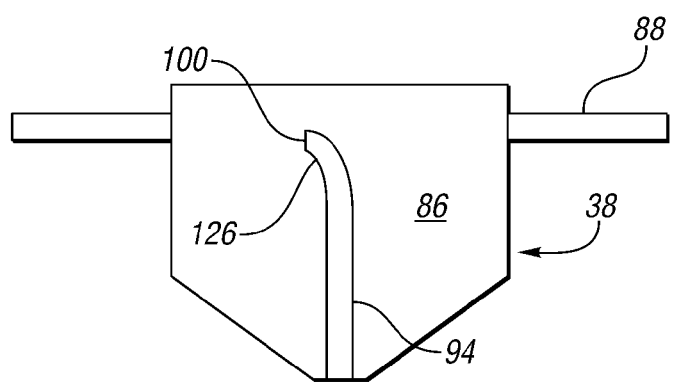
FIG. 5 is a schematic of yet another separator for a purge assembly according to an embodiment.

FIG. 5 illustrates a separator 38 having a secondary passage 94 with an entrance region 100 generally facing away from the inlet conduit 88. The secondary passage 94 has a bend 126. According to one embodiment, the bend 126 is approximately ninety degrees. In other embodiments, the bend 126 is an angle greater than zero degrees. The entrance region 100 is positioned such that the opening 100 faces away from the inlet conduit 88. Therefore, liquid flowing into the separation chamber 86 is unlikely to reach the entrance 100 of the secondary passage 94.

Figure 6:
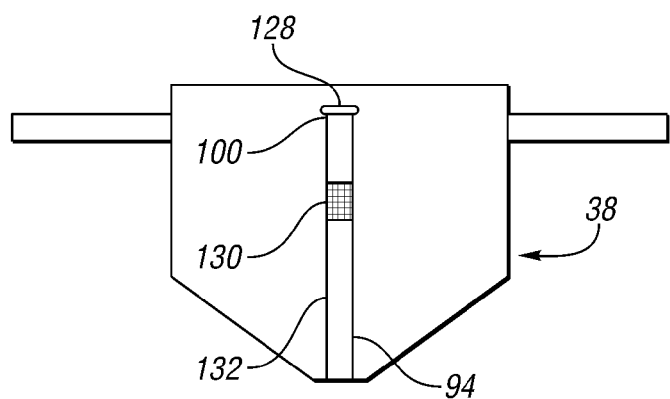
FIG. 6 is a schematic of another separator for a purge assembly according to an embodiment.

FIG. 6 illustrates a separator 38 having a modified secondary passage 94. A cap 128 is placed over the entrance region to the passage 94, thus sealing the entrance region 100. The passage 94 has openings 130 positioned along the wall 132 of the passage 94. The openings 130 may be provided by placing a screen or mesh between two sections of the passage 94. The openings 130 may also be provided as slots or apertures in the passage 94, and machined or otherwise formed into the passage 94. By placing a cap 128 over the entrance region 100, water is prevented from dripping into the passage 94 from above.

Various embodiments of the present invention have associated non-limiting advantages. For example, a nested drain line from a separator allows for uninterrupted fluid flow from the separator during freezing conditions. The drain line is bent such that the outer conduit forms a trap for liquid water. Any water within the outer conduit is permitted to freeze. Fluids, including byproduct water vapor and nitrogen, continue to flow through the inner conduit when the outer conduit has an ice blockage. This results in purge or drain process being available even during freezing conditions. Any ice formation in the trap is allowed to possibly melt with operation, and therefore the overall fuel cell efficiency is unaffected as there is no heating element. Since the purge or drain process may occur as needed, the fuel cell performance is also unaffected.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell system comprising:
a fuel cell stack; and
a purge assembly in fluid communication with the fuel cell stack, the purge assembly having:
a separator defining a chamber for receiving a recirculated fuel stream including a fluid portion and an impurities portion,
a purge valve positioned downstream of the separator for purging the impurities portion from the fuel cell system, and
a drain conduit connecting the separator and the purge valve, and having an outer passage connected to a lower end of the chamber and forming a fluid trap to collect the fluid portion, and an inner passage nested within the outer passage and extending through the fluid trap for delivering the impurities portion to the purge valve, the inner passage having a free end extending into the chamber.

2. The fuel cell system of claim 1 wherein the purge assembly is configured such that the fluid portion flows from the lower end of the separator into the outer passage and trap such that the fluid portion freezes within the trap during freezing conditions.

3. The fuel cell system of claim 2 wherein the fluid portion includes liquid water.

4. The fuel cell system of claim 1 wherein the inner passage remains generally free of the fluid portion such that the inner passage provides an unobstructed passageway for the impurities portion between the separator and the purge valve during freezing conditions.

5. The fuel cell system of claim 4 wherein the impurities portion includes nitrogen.

6. A fuel cell purge apparatus comprising:
a separator defining a chamber for receiving a recirculated fuel stream including a fluid and impurities; and
a drain conduit having an outer passage connected to the chamber and forming a fluid trap to collect the fluid, and an inner passage embedded within the outer passage through the fluid trap for delivering the impurities to a purge valve and having a free end extending into the chamber.

7. The fuel cell purge apparatus of claim 6 wherein the purge valve is positioned downstream of the separator for purging the impurities.

8. The fuel cell purge apparatus of claim 6 wherein the drain conduit is bent more than ninety degrees such that the outer passage forms the fluid trap.

9. The fuel cell purge apparatus of claim 6 wherein the drain conduit bends approximately one hundred and eighty degrees such that the outer passage forms the fluid trap.

10. The fuel cell purge apparatus of claim 6 wherein the outer passage is connected to a lower end of the chamber, and the free end of the inner passage is spaced apart from a lower end of the chamber.

11. The fuel cell purge apparatus of claim 6 wherein the separator and the drain conduit are coaxial about a longitudinal axis of the separator.

12. The fuel cell purge apparatus of claim 6 wherein the inner and outer passages are coaxial about a longitudinal axis of the drain conduit.

13. A fuel cell purge assembly comprising:
a separator defining a chamber for receiving a recirculated fuel stream including a fluid portion and an impurities portion through an inlet conduit,
a purge valve positioned downstream of the separator for purging the impurities portion from a fuel cell system, and
a drain conduit connecting the separator and the purge valve, and having an outer passage connected to a lower end of the chamber and forming a fluid trap to collect the fluid portion, and an inner passage nested within the outer passage and extending through the fluid trap for delivering the impurities portion to the purge valve, the inner passage having a free end extending into the chamber.

14. The fuel cell purge assembly of claim 13 wherein the inlet conduit is bent towards the lower end of the separator and the inner passage faces an upper end of the separator.

15. The fuel cell purge assembly of claim 13 wherein the separator has a protrusion extending from an upper end of the chamber into the chamber, the protrusion positioned to direct the recirculated fuel stream from the inlet conduit away from an entrance to the inner passage.

16. The fuel cell purge assembly of claim 13 wherein the inner passage is bent such that an entrance to the inner passage faces away from the inlet conduit.

17. The fuel cell purge assembly of claim 13 wherein the inner passage has a cap over the free end, the inner passage defining a series of apertures providing fluid communication between the chamber and the inner passage.

18. The fuel cell purge assembly of claim 13 wherein the fluid portion includes liquid water and the impurities portion includes nitrogen.

19. The fuel cell purge assembly of claim 18 wherein the purge assembly is configured such that the fluid portion flows from the lower end of the separator directly into the outer passage and trap such that the fluid portion freezes within the trap during freezing conditions.

20. The fuel cell purge assembly of claim 18 wherein the inner passage is configured to remain generally free of the fluid portion such that the inner passage provides an unobstructed passageway for the impurities portion between the separator and the purge valve during freezing conditions.

* * * * *